United States Patent
Jung et al.

(10) Patent No.: US 12,481,829 B2
(45) Date of Patent: Nov. 25, 2025

(54) CLINICAL TRIAL MAIN KEYWORD PREDICTION METHOD AND SERVER FOR EXECUTING SAME

(71) Applicant: MEDIAIPLUS CO, LTD., Incheon (KR)

(72) Inventors: Ji Hee Jung, Incheon (KR); Nam Goo Song, Incheon (KR)

(73) Assignee: MEDIAIPLUS CO, LTD., Incheon (KR)

( * ) Notice: Subject to any disclaimer, the term of this patent is extended or adjusted under 35 U.S.C. 154(b) by 200 days.

(21) Appl. No.: 18/033,968

(22) PCT Filed: Nov. 30, 2020

(86) PCT No.: PCT/KR2020/017232
§ 371 (c)(1),
(2) Date: Apr. 26, 2023

(87) PCT Pub. No.: WO2022/092409
PCT Pub. Date: May 5, 2022

(65) Prior Publication Data
US 2023/0394237 A1 Dec. 7, 2023

(30) Foreign Application Priority Data
Oct. 27, 2020 (KR) .......... 10-2020-0140279

(51) Int. Cl.
*G06F 40/284* (2020.01)
*G06F 16/33* (2025.01)
(Continued)

(52) U.S. Cl.
CPC .......... *G06F 40/284* (2020.01); *G06F 16/33* (2019.01); *G06F 16/332* (2019.01);
(Continued)

(58) Field of Classification Search
CPC .... G06F 40/284; G06F 40/279; G06F 40/268; G06F 40/30; G06F 16/33; G06F 16/332; G16H 10/20
See application file for complete search history.

(56) References Cited

U.S. PATENT DOCUMENTS 5,907,841 A * 5/1999 Sumita ................ G06F 16/345
707/999.005
2003/0220922 A1* 11/2003 Yamamoto .......... G06F 16/35
(Continued)

FOREIGN PATENT DOCUMENTS

| JP | 2013-518317 A | 5/2013 |
| JP | 2018-533123 A | 11/2018 |

(Continued)

OTHER PUBLICATIONS

Ho Young Jeong, et al., "Comparison of term weighting schemes for document classification", The Korean Journal of Applied Statistics, Apr. 30, 2019, pp. 265-276, vol. 32, Issue 2.
(Continued)

*Primary Examiner* — Samuel G Neway
(74) *Attorney, Agent, or Firm* — ZION IP; Byungwoong Park

(57) ABSTRACT

A clinical trial main keyword prediction method executed by a clinical trial main keyword prediction device according to an embodiment of the present invention comprises the steps of: when question data is received from a user terminal, removing predetermined clinical non-use words from the question data; extracting words on the basis of blanks from clinical trial title data obtained by removing the predetermined clinical non-use words; executing a morpheme analysis of each word to generate tokens each including a pair of a word and a morpheme value; inputting the tokens in a pre-trained learning model, and extracting tokens matching the tokens of the question data from the learning model;
(Continued)

arranging the tokens on the basis of a weight pre-assigned to each token and a frequency indicated by a label pre-assigned to each token; and converting the arranged tokens into text and providing the text to the user terminal.

2 Claims, 4 Drawing Sheets

(51) Int. Cl.
  *G06F 16/332* (2025.01)
  *G06F 40/268* (2020.01)
  *G06F 40/279* (2020.01)
  *G06F 40/30* (2020.01)
  *G16H 10/20* (2018.01)
(52) U.S. Cl.
  CPC .......... *G06F 40/268* (2020.01); *G06F 40/279* (2020.01); *G06F 40/30* (2020.01); *G16H 10/20* (2018.01)

(56) References Cited

U.S. PATENT DOCUMENTS

| | | | |
|---|---|---|---|
| 2005/0060651 A1* | 3/2005 | Anderson | G06F 40/268 707/E17.058 |
| 2011/0208728 A1* | 8/2011 | Ikawa | G06F 40/284 707/723 |
| 2012/0166450 A1* | 6/2012 | Choi | G06F 16/24534 707/E17.084 |
| 2014/0019445 A1* | 1/2014 | Iwasaki | G06F 40/289 707/725 |
| 2015/0134652 A1* | 5/2015 | Lee | G06F 16/951 707/730 |
| 2017/0277672 A1* | 9/2017 | Cho | G06F 40/279 |
| 2020/0050636 A1* | 2/2020 | Datla | G06F 40/30 |
| 2020/0227026 A1* | 7/2020 | Rajagopal | G06F 16/244 |
| 2020/0372088 A1* | 11/2020 | Liu | G06F 16/9532 |
| 2023/0394237 A1* | 12/2023 | Jung | G16H 10/20 |

FOREIGN PATENT DOCUMENTS

| | | |
|---|---|---|
| KR | 10-1709055 B1 | 2/2017 |
| KR | 10-1850772 B1 | 4/2018 |
| KR | 10-2020-0059791 A | 5/2020 |

OTHER PUBLICATIONS

International Search Report for PCT/KR2020/017232 dated Jul. 23, 2021 (PCT/ISA/210).

* cited by examiner

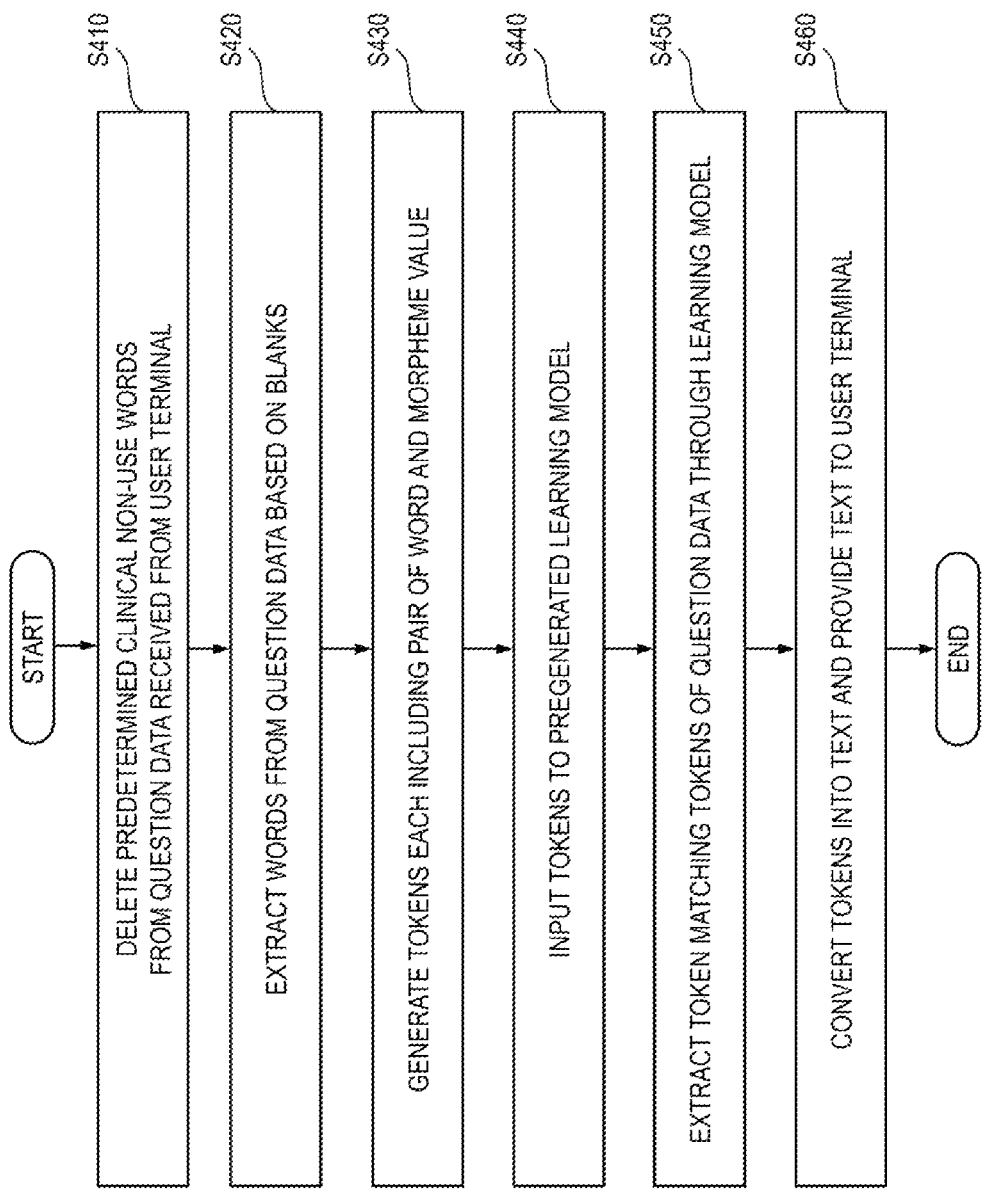

CLINICAL TRIAL MAIN KEYWORD PREDICTION METHOD AND SERVER FOR EXECUTING SAME

CROSS REFERENCE TO RELATED APPLICATIONS

This application is a National Stage of International Application No. PCT/KR2020/017232 filed Nov. 30, 2020, claiming priority based on Korean Patent Application No. 10-2020-0140279 filed Oct. 27, 2020.

TECHNICAL FIELD

The present disclosure relates to a method of predicting a main keyword of a clinical trial and a server for executing the same, and more specifically, to a method of predicting a main keyword of a clinical trial which allows effective search from and classification of clinical trial data being increased by extracting a main keyword that is representative of a corresponding clinical trial from a clinical trial title, and a server for executing the same.

BACKGROUND ART

As the biotechnology industry expands, clinical trials for developing new medicines are increasing. In general, a clinical trial may be defined as a test or study conducted on human subjects to evaluate the efficacy of a newly developed medicine or establish safety standards, check the range of applicable diseases, appropriate dosage, the range of side effects, pharmacokinetics, pharmacology, clinical effects, etc. of the corresponding medicines, etc. and examine adverse reactions or harmful drug reactions.

Such clinical trials are used through conventional case report forms (CRFs). Clinical trials are being used to objectively and experientially verify the hypothesis or purpose of a clinical trial by writing several interviews, drug administration, examination, and evaluation of a large number of subjects on paper media and statistically analyzing the data collected during the process.

However, such paper media-based clinical trial data management not only involves extreme difficulty in data storage, maintenance, and security but also has inherent problems such as extremely limited data sharing, data reprocessing, variability or fluidity of test or review period, follow-up reference, utilization, etc.

Recently, to solve this problem, some electronic data-based clinical trial management systems (electronic CRF (eCRF) systems) have been disclosed. Such a clinical trial management system includes a clinical data database for storing clinical trial data.

Meanwhile, a clinical trial management system provides clinical data stored in a clinical data database to clinical researchers. Accordingly, researchers conducting clinical research search for necessary items in consideration of their research subjects.

DISCLOSURE

Technical Problem

The present disclosure is directed to providing a method of predicting a main keyword of a clinical trial which allows effective search and classification from clinical trial data being increased by extracting a main keyword that is representative of a corresponding clinical trial from a clinical trial title, and a server for executing the same.

Technical problems to be solved by disclosure are not limited to that described above. Other technical problems and advantages of the present disclosure which have not been described will be understood from the following description and more clearly understood through embodiments of the present disclosure. Also, it will be readily seen that the technical problems and advantages of the present disclosure may be achieved by means described in the claims and combinations thereof.

Technical Solution

One aspect of the present disclosure provides a method of predicting a main keyword of a clinical trial by a clinical trial main keyword prediction device, the method including, when question data is received from a user terminal, deleting predetermined clinical non-use words from the question data, extracting words from clinical trial title data from which the predetermined clinical non-use words are deleted on the basis of a blank, performing morpheme analysis of each of the words to generate tokens each including a pair of a word and a morpheme value, inputting the tokens to a pretrained learning model and extracting tokens matching the tokens of the question data through the learning model, arranging the tokens on the basis of weights preassigned to the tokens and frequencies indicated by labels preassigned to the tokens, and converting the arranged tokens into text and providing the text to the user terminal.

Another aspect of the present disclosure provides a device for predicting a main keyword of a clinical trial, the device including a keyword question unit configured to delete, when question data is received from a user terminal, predetermined clinical non-use words from the question data, extract words from clinical trial title data from which the predetermined clinical non-use words are deleted on the basis of a blank, generate tokens each including a pair of a word and a morpheme value by performing morpheme analysis of each of the words, and input the tokens to a pretrained learning model and a keyword extraction unit configured to extract tokens matching the tokens of the question data through the learning model, arrange the tokens on the basis of weights preassigned to the tokens and frequencies indicated by labels preassigned to the tokens, convert the arranged tokens into text, and provide the text to the user terminal.

Advantageous Effects

According to the above-described present disclosure, it is possible to effectively search from and classify clinical trial title data being increased by extracting a main keyword which is representative of a corresponding clinical trial from a clinical trial title.

DESCRIPTION OF DRAWINGS

FIG. 4 is a flowchart illustrating a method of predicting a main keyword of a clinical trial according to another embodiment of the present disclosure.

MODE FOR INVENTION

Figure 1:
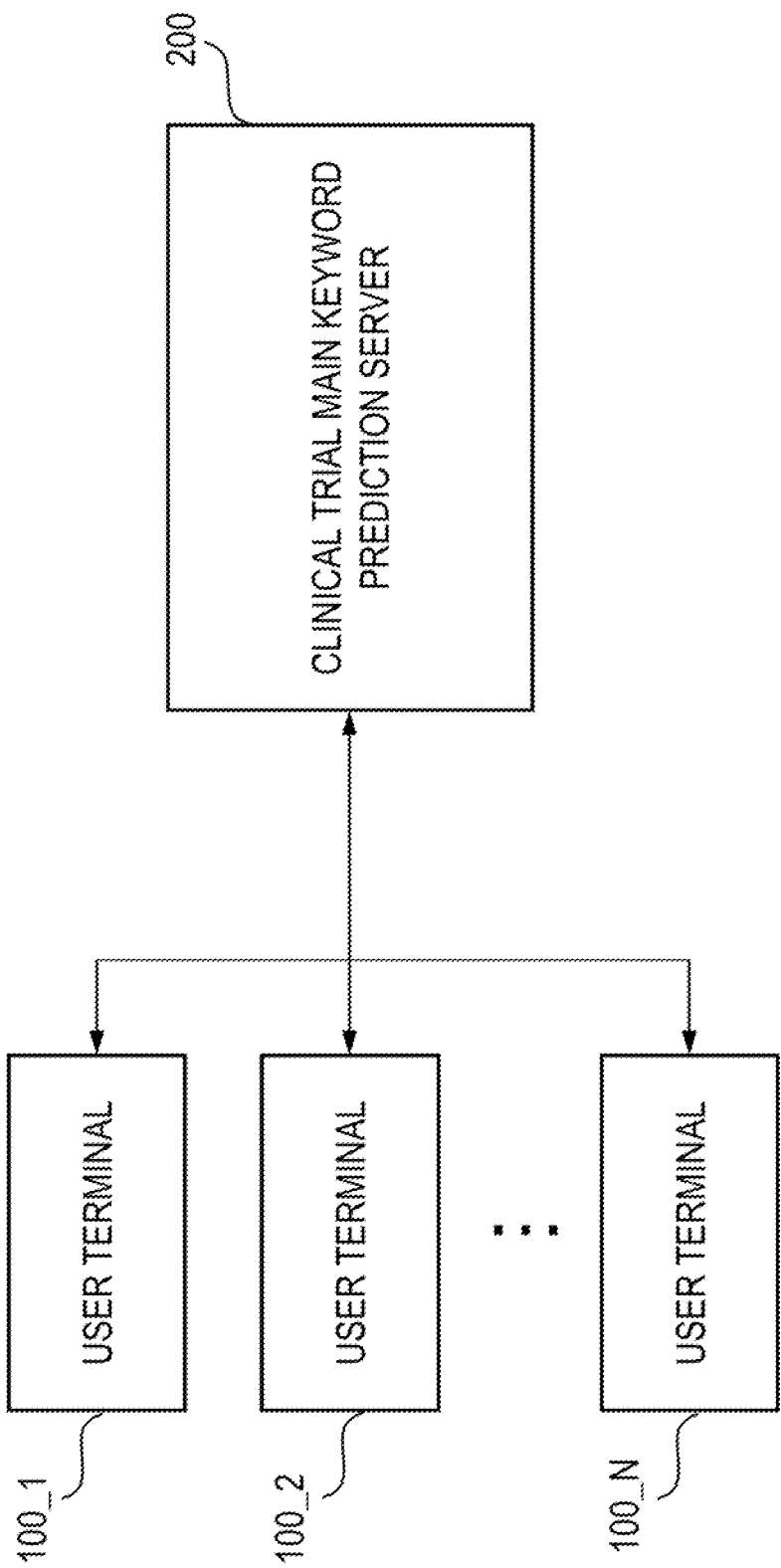
FIG. 1 is a network configuration diagram illustrating a system for predicting a main keyword of a clinical trial according to an embodiment of the present disclosure.

The foregoing technical problems, features, and advantages will be described in detail below with reference to the accompanying drawings. Accordingly, those skilled in the technical field to which the present disclosure pertains may readily implement the technical spirit of the present disclosure. In describing the present disclosure, when the detailed description of a well-known technology related to the present disclosure is determined to unnecessarily obscure the gist of the present disclosure, the detailed description will be omitted. Hereinafter, exemplary embodiments of the present disclosure will be described in detail with reference to the accompanying drawings. Throughout the drawings, like reference numerals refer to like components.

FIG. 1 is a network configuration diagram illustrating a system for predicting a main keyword of a clinical trial according to an embodiment of the present disclosure.

Referring to FIG. 1, the system for predicting a main keyword of a clinical trial includes user terminals 100_1 to 100_N and a clinical trial main keyword prediction server 200.

The user terminals 100_1 to 100_N are terminals held by users who input question data to the clinical trial main keyword prediction server 200 and receive keywords corresponding to the question data. Each of the user terminals 100_1 to 100_N may be implemented as a smartphone, a tablet personal computer (PC), a laptop computer, a desktop computer, etc.

The clinical trial main keyword prediction server 200 is a server that receives the question data from the user terminal 100_1 to 100_N, extracts keywords of the question data using a pretrained learning model, and provides the keywords to the user terminals 100_1 to 100_N.

First, a process in which the clinical trial main keyword prediction server 200 generates the pretrained learning model will be described.

The clinical trial main keyword prediction server 200 extracts clinical trial title data of clinical trial data from a clinical trial database and preprocesses the clinical trial title data on the basis of a clinical non-use word database.

According to an embodiment, the clinical trial main keyword prediction server 200 deletes a predetermined clinical non-use word from the clinical trial title data.

For example, when clinical trial title data "A Randomized, Double Blind Trial of LdT (Telbivudine) Versus Lamivudine in Adults With Compensated Chronic Hepatitis B" is received, the clinical trial main keyword prediction server 200 deletes "A," "of," "in," "with," and "B" which are predetermined clinical non-use words.

According to another embodiment, the clinical trial main keyword prediction server 200 deletes predetermined clinical non-use parts of speech from the clinical trial title data. Here, the predetermined clinical non-use parts of speech may include articles, prepositions, conjunctions, exclamations, etc.

After that, the clinical trial main keyword prediction server 200 extracts words from the clinical trial title data from which the predetermined clinical non-use words are deleted on the basis of blanks and measures frequencies of the words on the basis of a word-specific frequency database which is generated in advance.

For example, when a frequency stored for "Chronic" in the pre-generated word-specific frequency database is 1000, the clinical trial main keyword prediction server 200 determines a frequency of "Chronic" as 1000.

Subsequently, the clinical trial main keyword prediction server 200 performs morpheme analysis of each word to generate a token which includes a pair of a word and a morpheme value and to which a label indicating a frequency is assigned.

For example, the clinical trial main keyword prediction server 200 may generate tokens, such as (frequency: 1000, (a word, a morpheme value)), (frequency: 234, (a word, a morpheme)), (frequency: 2541, (a word, a morpheme)), (frequency: 2516, (a word, a morpheme)), etc., from the clinical trial title from which the predetermined clinical non-use words are deleted.

After the tokens are generated as described above on the basis of the clinical trial title data from which the predetermined clinical non-use words are deleted, the clinical trial main keyword prediction server 200 assigns different weights to the tokens according to words and labels of the tokens.

According to an embodiment, the clinical trial main keyword prediction server 200 assigns different weights to the tokens according to types of languages (i.e., English, Chinese, Korean, etc.) corresponding to words of the tokens, positions of the words in the clinical trial title, and frequencies of the labels assigned to the tokens.

Subsequently, the clinical trial main keyword prediction server 200 vectorizes the tokens and then generates a learning model through training with the vectorized tokens. Such a learning model is a model for extracting, when question data is received from the user terminals 100_1 to 100_N, keywords corresponding to the question data.

A process of extracting a keyword corresponding to question data using a learning model will be described below.

First, when question data is received from the user terminals 100_1 to 100_N, the clinical trial main keyword prediction server 200 deletes predetermined clinical non-use words from the question data and extract words from clinical trial title data from which the predetermined clinical non-use words are deleted on the basis of blanks.

Subsequently, the clinical trial main keyword prediction server 200 performs morpheme analysis of each word to generate tokens each including a pair of a word and a morpheme value and inputs the tokens to the pretrained learning model.

Finally, the clinical trial main keyword prediction server 200 extracts tokens matching the tokens of the question data through the learning model and arranges the tokens on the basis of weights preassigned to the tokens and frequencies indicated by labels preassigned to the tokens.

This is because, even when a large number of tokens matching the tokens of the question data are extracted through the learning model, tokens having a high weight and a high frequency are similar to the tokens of the question data.

Therefore, after arranging the tokens, the clinical trial main keyword prediction server 200 converts the tokens into text and provides the text to the user terminals 100_1 to 100_N.

Figure 2:
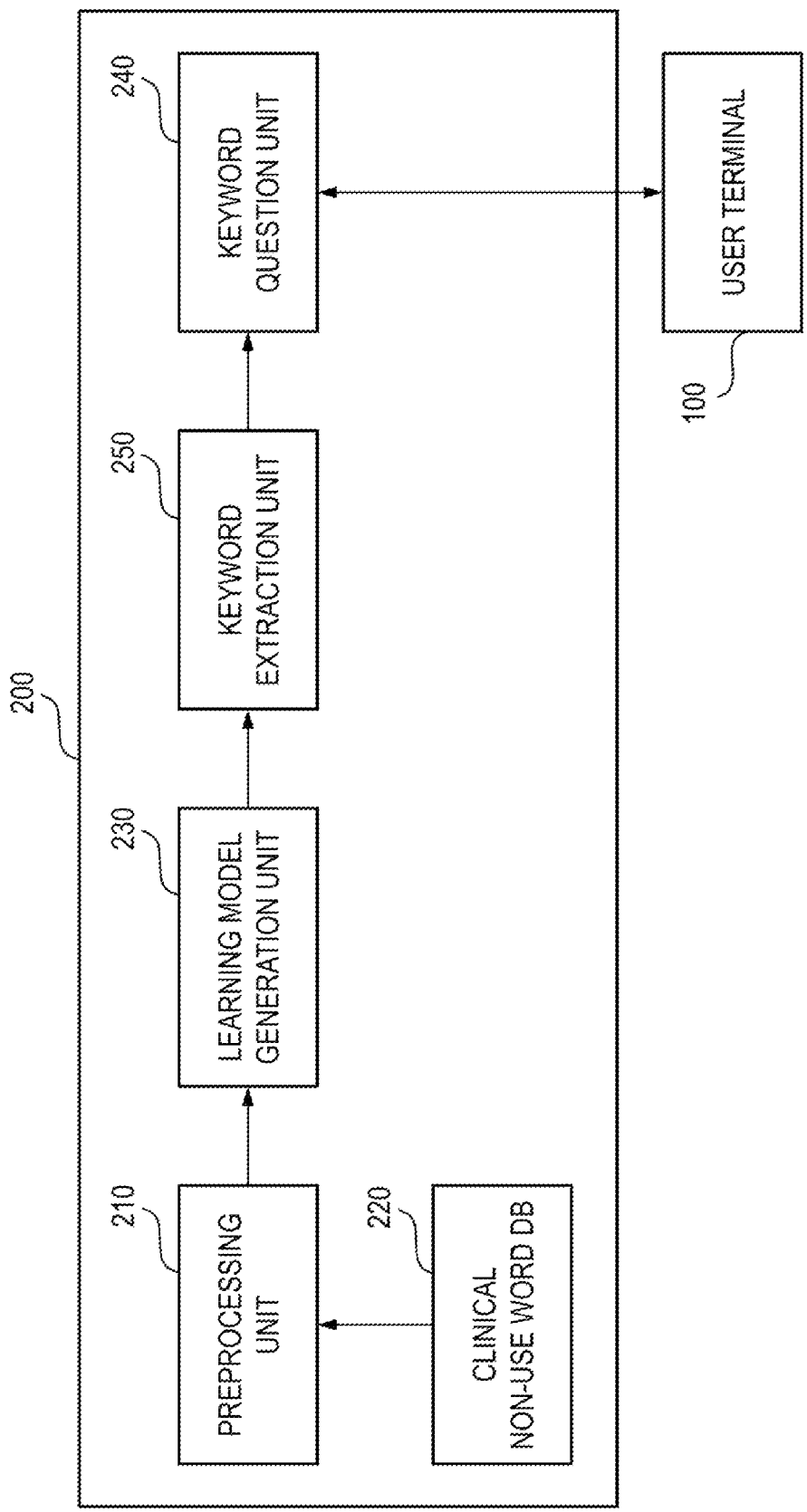
FIG. 2 is a block diagram illustrating an internal structure of a server for predicting a main keyword of a clinical trial according to an embodiment of the present disclosure.

FIG. 2 is a block diagram illustrating an internal structure of a server for predicting a main keyword of a clinical trial according to an embodiment of the present disclosure.

Referring to FIG. 2, the clinical trial main keyword prediction server 200 includes a preprocessing unit 210, a clinical non-use word database 220, a learning model generation unit 230, a keyword question unit 240, and a keyword extraction unit 250.

The preprocessing unit 210 receives clinical trial title data of clinical trial data from a clinical trial database and preprocesses the clinical trial title data on the basis of the clinical non-use database 220.

According to an embodiment, the preprocessing unit 210 deletes predetermined clinical non-use words stored in the clinical non-use database 220 from the clinical trial title data.

For example, when clinical trial title data "A Randomized, Double Blind Trial of LdT (Telbivudine) Versus Lamivudine in Adults With Compensated Chronic Hepatitis B" is received, the preprocessing unit 210 deletes "A," "of," "in," "with," and "B" which are predetermined clinical non-use words.

According to another embodiment, the preprocessing unit 210 deletes predetermined clinical non-use parts of speech stored in the clinical non-use database 220 from the clinical trial title data. Here, the predetermined clinical non-use parts of speech may include articles, prepositions, conjunctions, exclamations, etc.

After that, the preprocessing unit 210 extracts words from the clinical trial title data from which the predetermined clinical non-use words are deleted on the basis of blanks and measures frequencies of the words on the basis of a word-specific frequency database which is generated in advance.

For example, when a frequency stored for "Chronic" in the pre-generated word-specific frequency database is 1000, preprocessing unit 210 determines a frequency of "Chronic" as 1000.

Subsequently, the preprocessing unit 210 performs morpheme analysis of each word to generate a token which includes a pair of a word and a morpheme value and to which a label indicating a frequency is assigned.

For example, the preprocessing unit 210 may generate tokens, such as (frequency: 1000, (a word, a morpheme value)), (frequency: 234, (a word, a morpheme)), (frequency: 2541, (a word, a morpheme)), (frequency: 2516, (a word, a morpheme)), etc., from the clinical trial title from which the predetermined clinical non-use words are deleted.

The learning model generation unit 230 assigns different weights to the tokens generated by the preprocessing unit 210 according to words and labels of the tokens.

In other words, the learning model generation unit 230 assigns different weights to the tokens according to types of languages (i.e., English, Chinese, Korean, etc.) corresponding to words of the tokens, positions of the words in the clinical trial title, and frequencies of the labels assigned to the tokens.

First, the learning model generation unit 230 calculates a first weight using the total number of tokens generated from the clinical trial title and the order of each token on the basis of [Equation 1] below.

$$W1 = \{token\_i / token(input\_data) \times L\} \quad \text{[Equation 1]}$$

W1: a first weight of a token,
input_data: a clinical trial title,
token( ): a function for returning the total number of tokens after a clinical trial title is tokenized,
token_i: the number of the $i^{th}$ token among the total number of tokens,
i: a number indicating the position of a token, and
L: an important value predetermined according to the type of language In other words, the learning model generation unit 230 calculates a first weight according to the order of a token based on the total number of tokens and an important value predetermined according to the type of language based on [Equation 1].

For example, when the total number of tokens is 12 and the order of a token is fourth, the learning model generation unit 230 may calculate "0.25" and then calculate a first weight by applying an important value predetermined according to the type of language to the calculated value.

Here, the important value predetermined according to the type of language may change depending on a position at which an important word is present according to the type of language. In other words, the important value predetermined according to the type of language may change depending on the number of a current token.

After that, the learning model generation unit 230 may calculate a second weight for each token using a frequency indicated by a label preassigned to the token and frequencies indicated by labels preassigned to the preceding token and the subsequent token on the basis of [Equation 2] and [Equation 3].

$$\text{Difference\_value} = \{f(token\_i-1) + f(token\_i) + f(token\_i+1)\}/3 \quad \text{[Equation 2]}$$

Difference_value: the average of frequencies
token_i: an $i^{th}$ token among the total number of tokens,
token_i−1: the token preceding the $i^{th}$ token among the total number of tokens,
token_i+1: the token subsequent to the $i^{th}$ token among the total number of tokens,
f( ): a function for extracting a frequency indicated by a label assigned to a token, and
i: a number indicating a position of a token $$\text{If(Difference\_Value} > \text{Threshold)}, W2 = 0$$

$$\text{Else(Difference\_Value} < \text{Threshold)}, W2 = 1 \quad \text{[Equation 3]}$$

W2: a second weight of a token,
Difference_Value: the average of frequencies calculated with [Equation 2]
Threshold: a threshold value As described above, the learning model generation unit 230 calculates a first weight and a second weight on the basis of [Equation 1] to [Equation 3] and then calculates a final weight using the first weight and the second weight to assign the final weight.

After that, the learning model generation unit 230 vectorizes the tokens and generates a learning model through training with the vectorized tokens. Such a learning model is a model for extracting, when question data is received from the user terminals 100_1 to 100_N, keywords corresponding to the question data.

When question data is received from the user terminals 100_1 to 100_N, the keyword question unit 240 deletes predetermined clinical non-use words from the question data and extracts words from the clinical trial title from which the predetermined clinical non-use words are deleted on the basis of blanks.

Subsequently, the keyword question unit 240 performs morpheme analysis of each word to generate tokens each including a pair of a word and a morpheme value, and inputs the tokens to the pretrained learning model.

When a token of the question data is input to the learning model generated by the learning model generation unit 230, the keyword extraction unit 250 extracts a token matching the token of the question data through the learning model, converts the token into text, and provides the text to the user terminals 100_1 to 100_N.

According to an embodiment, the keyword extraction unit 250 extracts tokens matching the tokens of the question data through the learning model and arranges the tokens on the basis of weights preassigned to the extracted tokens and frequencies indicated by labels preassigned to the extracted tokens.

This is because, even when a large number of tokens matching the tokens of the question data are extracted through the learning model, tokens having a high weight and a high frequency are similar to the tokens of the question data.

Therefore, after arranging the tokens, the keyword extraction unit 250 converts the tokens into text and provides the text to the user terminals 100_1 to 100_N.

Figure 3:
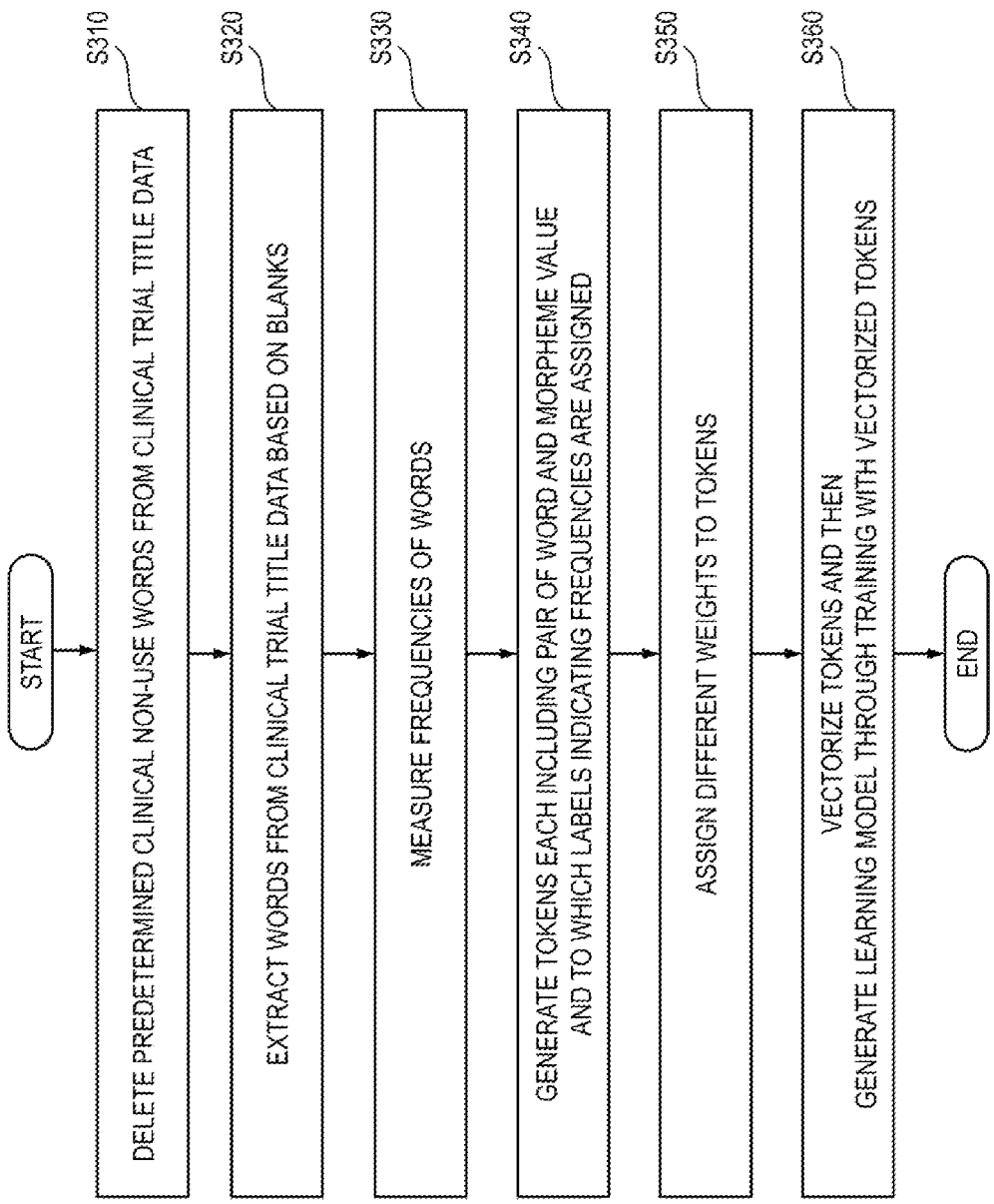
FIG. 3 is a flowchart illustrating a method of predicting a main keyword of a clinical trial according to an embodiment of the present disclosure.

FIG. 3 is a flowchart illustrating a method of predicting a main keyword of a clinical trial according to an embodiment of the present disclosure. The embodiment disclosed in FIG. 3 is an embodiment of generating a learning model for predicting a main keyword of a clinical trial.

Referring to FIG. 3, the clinical trial main keyword prediction device 200 deletes predetermined clinical non-use words from clinical trial title data (operation S310).

According to an embodiment of operation S310, the clinical trial main keyword prediction device 200 deletes predetermined clinical non-use words stored in the clinical non-use database 220 from the question data.

According to another embodiment of operation S310, the clinical trial main keyword prediction device 200 deletes predetermined clinical non-use parts of speech stored in the clinical non-use database 220 from the question data. Here, the predetermined clinical non-use parts of speech may include articles, prepositions, conjunctions, exclamations, etc.

The clinical trial main keyword prediction device 200 extracts words from the clinical trial title data from which the predetermined clinical non-use words are deleted on the basis of blanks (operation S320).

The clinical trial main keyword prediction device 200 measures frequencies of the words on the basis of a word-specific frequency database which is generated in advance (operation S330).

The clinical trial main keyword prediction device 200 performs morpheme analysis of each word and generates a token which includes a pair of a word and a morpheme value and to which a label indicating a frequency is assigned (operation S340).

The clinical trial main keyword prediction device 200 assigns different weights to the tokens of a dataset on the basis of words of the corresponding tokens and labels assigned to the tokens (operation S350).

The clinical trial main keyword prediction device 200 vectorizes the tokens and then generates a learning model through training with the vectorized tokens (operation S360).

FIG. 4 is a flowchart illustrating a method of predicting a main keyword of a clinical trial according to another embodiment of the present disclosure. The embodiment disclosed in FIG. 4 is an embodiment of predicting and providing a keyword corresponding to question data received from a user terminal on the basis of a learning model.

Referring to FIG. 4, the clinical trial main keyword prediction device 200 deletes predetermined clinical non-use words from question data received from the user terminals 100_1 to 100_N (operation S410).

According to an embodiment of operation S410, the clinical trial main keyword prediction device 200 deletes predetermined clinical non-use words stored in the clinical non-use database 220 from the question data.

According to another embodiment of operation S410, the clinical trial main keyword prediction device 200 deletes predetermined clinical non-use parts of speech stored in the clinical non-use database 220 from the question data. Here, the predetermined clinical non-use parts of speech may include articles, prepositions, conjunctions, exclamations, etc.

The clinical trial main keyword prediction device 200 extracts words from the question data from which the predetermined clinical non-use words are deleted on the basis of blanks (operation S420).

The clinical trial main keyword prediction device 200 performs morpheme analysis of each word and generates tokens each including a pair of a word and a morpheme value (operation S430).

For example, the clinical trial main keyword prediction device 200 may generate tokens, such as (a word, a morpheme value), (a word, a morpheme), (a word, a morpheme), (a word, a morpheme), etc., from the question data from which the predetermined clinical non-use words are deleted.

The clinical trial main keyword prediction device 200 inputs the tokens generated in operation S430 to a learning model which is generated in advance (operation S440).

The clinical trial main keyword prediction device 200 extracts tokens matching the tokens of the question data through the learning model (operation S450), converts the tokens into text, and provides the text to the user terminals 100_1 to 100_N (operation S460).

Although the present disclosure has been described with reference to limited embodiments and drawings, various alterations and modifications can be made by those of ordinary skill in the art to which the present disclosure pertains. Therefore, the spirit of the present disclosure should be determined by only the following claims, and all equivalents or equivalent modifications thereof fall within the scope of the present disclosure.

The invention claimed is:

1. A method of predicting a main keyword of a clinical trial, which is performed by a clinical trial main keyword prediction device which includes a memory storing computer-executable instructions which when executed by one or more processors, cause the one or more processors to perform operations comprising:
   receiving question data from a user terminal;
   deleting predetermined clinical non-use words from the question data;
   extracting words from clinical trial title data from which the predetermined clinical non-use words are deleted on the basis of a blank;
   performing morpheme analysis of each of the words to generate first tokens each including a pair of a word and a morpheme value;
   inputting the first tokens to a pretrained learning model and extracting second tokens matching the first tokens of the question data through the learning model;
   arranging the second tokens on the basis of weights preassigned to the second tokens and frequencies indicated by labels preassigned to the second tokens;
   converting the arranged second tokens into text and providing the text to the user terminal;

deleting the predetermined clinical non-use words from the clinical trial title data;
extracting words from the clinical trial title data from which the predetermined clinical non-use words are deleted on the basis of blanks;
performing morpheme analysis of each of the words to generate third tokens each including a pair of a word and a morpheme value and to which labels indicating frequencies are assigned;
assigning different weights to the third tokens according to words and labels of the third tokens;
vectorizing the third tokens; and
generating the learning model through training with the vectorized third tokens,
wherein
the different weights are assigned to the third tokens according to types of languages including English, Chinese and Korean corresponding to the words of the third tokens, positions of the words in the clinical trial title, and the frequencies of the labels assigned to the third tokens,
a first weight is calculated by using a total number of the third tokens and an order of each of the third token on the basis of Equation 1 below:

$$W1=\{token\_i/token(input\_data)\}*L \qquad \text{[Equation 1]}$$

where
W1: the first weight,
input_data: the clinical trial title,
token( ): a function for returning the total number of the third tokens after the clinical trial title is tokenized,
token_i: a number of an $i_{th}$ token among the total number of the third tokens,
i: a number indicating the position of a token, and
L: an importance value predetermined according to the type of language, and
a second weight is further calculated for each token of the third tokens on the basis of Equation 2 and Equation 3 below:

$$\text{Difference\_value}=\{f(token\_i-1)+f(token\_i)+f(token\_i+1)\}/3 \qquad \text{[Equation 2]}$$

where
Difference_value: an average of frequencies,
token_i: an $i_{th}$ token among the total number of the third tokens,
token_i−1: a token preceding the $i_{th}$ token among the total number of the third tokens,
token_i+1: a token subsequent to the $i_{th}$ token among the total number of the third tokens,
f( ): a function for extracting the frequency indicated by the label assigned to one of the third tokens, and
i: a number indicating a position of one of the third tokens, $$\text{If(Difference\_Value>Threshold)}, W2=0$$

$$\text{Else(Difference\_Value<Threshold)}, W2=1 \qquad \text{[Equation 3]}$$

where
W2: the second weight of a token,
Difference_Value: the average of the frequencies calculated with [Equation 2], and
Threshold: a threshold value.

2. A device for predicting a main keyword of a clinical trial, the device comprising:
a keyword question unit configured to delete, when question data is received from a user terminal, predetermined clinical non-use words from the question data, extract words from clinical trial title data from which the predetermined clinical non-use words are deleted on the basis of a blank, generate first tokens each including a pair of a word and a morpheme value by performing morpheme analysis of each of the words, and input the first tokens to a pretrained learning model;
a keyword extraction unit configured to extract second tokens matching the first tokens of the question data through the learning model, arrange the second tokens on the basis of weights preassigned to the second tokens and frequencies indicated by labels preassigned to the second tokens, convert the arranged second tokens into text, and provide the text to the user terminal;
a preprocessing unit configured to delete the predetermined clinical non-use words from the clinical trial title data, extract words from the clinical trial title data from which the predetermined clinical non-use words are deleted on the basis of blanks and generate third tokens each including a pair of a word and a morpheme value and to which labels indicating frequencies are assigned by performing morpheme analysis of each of the words; and
a learning model generation unit configured to assign different weights to the third tokens according to words and labels of the third tokens, vectorize the third tokens, and then generate the learning model through training with the vectorized third tokens,
wherein
the learning model generation unit assigns the different weights to the third tokens according to types of languages including English, Chinese and Korean corresponding to the words of the third tokens, positions of the words in the clinical trial title, and the frequencies of the labels assigned to the third tokens,
the learning model generation unit calculates a first weight using a total number of the third tokens and an order of each of the third token on the basis of Equation 1 below:

$$W1=\{token\_i/token(input\_data)\}*L \qquad \text{[Equation 1]}$$

where
W1: the first weight,
input_data: the clinical trial title,
token( ): a function for returning the total number of the third tokens after the clinical trial title is tokenized,
token_i: a number of an $i_{th}$ token among the total number of the third tokens,
i: a number indicating the position of a token, and
L: an importance value predetermined according to the type of language and
the learning model generation unit further calculates a second weight for each token of the third tokens on the basis of Equation 2 and Equation 3 below:

$$\text{Difference\_value}=\{f(token\_i-1)+f(token\_i)+f(token\_i+1)\}/3 \qquad \text{[Equation 2]}$$

where
Difference_value: an average of frequencies,
token_i: an $i_{th}$ token among the total number of the third tokens,
token_i−1: a token preceding the $i_{th}$ token among the total number of the third tokens,
token_i+1: a token subsequent to the $i_{th}$ token among the total number of the third tokens,
f( ): a function for extracting the frequency indicated by the label assigned to one of the third tokens, and i: a number indicating a position of one of the third tokens, $$\text{If}(\text{Difference\_Value} > \text{Threshold}), W2=0$$

$$\text{Else}(\text{Difference\_Value} < \text{Threshold}), W2=1 \quad \text{[Equation 3]}$$

where
W2: the second weight of a token,
Difference_Value: the average of the frequencies calculated with [Equation 2], and
Threshold: a threshold value.

* * * * *